United States Patent
Iwasaki-Higbee (10) Patent No.: US 8,186,385 B2
(45) Date of Patent: May 29, 2012

(54) PACKER FOR INSTALLING SEALANT IN DEFECTIVE CONDUITS

(76) Inventor: Jeffrey L. Iwasaki-Higbee, Honolulu, HI (US)

( * ) Notice: Subject to any disclaimer, the term of this patent is extended or adjusted under 35 U.S.C. 154(b) by 227 days.

(21) Appl. No.: 12/459,727

(22) Filed: Jul. 6, 2009

(65) Prior Publication Data

US 2011/0000567 A1 Jan. 6, 2011

(51) Int. Cl.
*F16L 55/18* (2006.01)

(52) U.S. Cl. ............................ 138/98; 138/97; 138/93

(58) Field of Classification Search ............... 138/97, 138/93, 98; 137/15.11, 15.15
See application file for complete search history.

(56) References Cited

U.S. PATENT DOCUMENTS

| | | | |
|---|---|---|---|
| 1,736,293 A | 11/1929 | Van Denburg | |
| 3,103,235 A * | 9/1963 | Stringham, III | 138/97 |
| 3,267,967 A | 8/1966 | Guthrie | |
| 3,269,421 A * | 8/1966 | Telford et al. | 138/97 |
| 3,602,263 A | 8/1971 | Bremner | |
| 3,618,639 A * | 11/1971 | Daley et al. | 138/97 |
| 3,710,812 A | 1/1973 | Wise | |
| 3,762,446 A | 10/1973 | Tungseth et al. | |
| 3,834,421 A * | 9/1974 | Daley | 138/97 |
| 3,834,422 A * | 9/1974 | Larson | 138/97 |
| 3,946,761 A * | 3/1976 | Thompson et al. | 138/98 |
| 3,958,607 A * | 5/1976 | Gray | 138/97 |
| 4,244,895 A | 1/1981 | Nakashin | |
| 4,245,970 A | 1/1981 | St. Onge | |
| 4,386,628 A | 6/1983 | Stanley | |
| 4,421,698 A | 12/1983 | Vanderlans | |
| 4,529,008 A | 7/1985 | Appleton | |
| 4,572,228 A * | 2/1986 | Larson et al. | 137/15.11 |
| 4,602,974 A | 7/1986 | Wood et al. | |
| 4,861,248 A * | 8/1989 | Ben | 425/13 |
| 4,867,921 A | 9/1989 | Steketee, Jr. | |
| 4,889,449 A | 12/1989 | Lee | |
| 4,972,880 A | 11/1990 | Strand | |
| 5,027,895 A * | 7/1991 | Barton | 166/186 |
| 5,063,967 A | 11/1991 | Stephens | |

(Continued)

FOREIGN PATENT DOCUMENTS

DE 40 24 926 A1 2/1992

(Continued)

OTHER PUBLICATIONS

Neil J. Stephens, An Australian Conduit Grouting System, 1992, entire document, but particularly pp. 1-4 and 7-8.

(Continued)

*Primary Examiner* — Patrick F Brinson
(74) *Attorney, Agent, or Firm* — Chernoff Vilhauer McClung & Stenzel LLP (57) ABSTRACT

A flexible inflatable packer for use in installation of a sealant such as grout in joints and defects in a conduit such as a sewer pipe, and a method for sealing defects in a conduit by use of such a packer. The packer can collapse to a slender configuration for movement through a small conduit to a location along the length of the conduit where repair is needed. The packer can be inflated to place a sealing portion adjacent each end of the packer into sealing contact with the interior of the conduit, while a centrally located portion of the packer defines space into which a fluid sealant can be installed to repair cracks or holes in the conduit. The centrally located portion of the packer supports the sealant material during a process of curing.

36 Claims, 5 Drawing Sheets

U.S. PATENT DOCUMENTS

| | | | |
|---|---|---|---|
| 5,194,193 | A | 3/1993 | Humphreys et al. |
| 5,346,658 | A | 9/1994 | Gargiulo |
| 5,351,720 | A | 10/1994 | Maimets |
| 5,384,086 | A | 1/1995 | Smith |
| 5,469,891 | A | 11/1995 | Lund et al. |
| 5,501,248 | A | 3/1996 | Kiest, Jr. |
| 5,549,856 | A | 8/1996 | Yokoshima |
| 5,560,395 | A | 10/1996 | Bissonnette et al. |
| 5,632,952 | A | 5/1997 | Mandich |
| 5,656,117 | A | 8/1997 | Wood et al. |
| 5,706,861 | A | 1/1998 | Wood et al. |
| 5,732,742 | A | 3/1998 | Mentzer et al. |
| 5,765,597 | A | 6/1998 | Kiest, Jr. et al. |
| 5,791,378 | A | 8/1998 | Stephens |
| 5,803,665 | A * | 9/1998 | Stephens .................. 405/146 |
| 5,906,789 | A | 5/1999 | Kamiyama et al. |
| 5,983,948 | A | 11/1999 | Yagi et al. |
| 6,056,016 | A | 5/2000 | Rogers |
| 6,167,912 | B1 | 1/2001 | Stephens |
| 6,361,015 | B1 | 3/2002 | Warmerdam |
| 6,415,824 | B2 | 7/2002 | Stephens |
| 6,416,692 | B1 | 7/2002 | Iwasaki-Higbee |
| 7,012,042 | B1 | 3/2006 | Cataldo et al. |
| 7,717,137 | B2 * | 5/2010 | Bednarzik .................. 138/93 |
| 2002/0083990 | A1 | 7/2002 | Lundman |
| 2002/0124898 | A1 | 9/2002 | Renaud et al. |
| 2004/0089358 | A1 | 5/2004 | Burd et al. |
| 2004/0108009 | A1 | 6/2004 | Kamiyama et al. |
| 2004/0134552 | A1 | 7/2004 | Renteria |
| 2005/0016607 | A1 | 1/2005 | St. Onge et al. |
| 2008/0047624 | A1 | 2/2008 | Iwasaki-Higbee |

FOREIGN PATENT DOCUMENTS

| | | |
|---|---|---|
| DE | 40 28 169 A1 | 3/1992 |
| DE | 195 38 813 A1 | 4/1997 |
| EP | 0 855 547 A1 | 7/1998 |
| GB | 2 123 919 A | 0/1884 |
| GB | 2 249 602 A | 5/1992 |

OTHER PUBLICATIONS

Sewliner Pty. Limited. Fulline 3000, at least as early as 1999.
Logiball, inc. Flexible Push-Type Packer for Laterals, Internet web page stating copyright 2004, print out from www.logiball.com on Jul. 1, 2009.
Scialdone, Frank, *New Technology is Nothing New in Markham*, Trenchless Technology, Jul. 1996, pp. 28-29.
Logiball, Inc. advertisement in *2007/2008 Directory of the North American Trenchless Technology Industry*, p. 79.
Logiball, Inc. advertisement in *Trenchless Technology*, Sep. 2007, p. 24.
Logiball, Inc. advertisement in *Trenchless Technology*, Apr. 2008, p. 15.
American Logiball advertisement in *Water Control Quarterly*, Jul. 1995, p. 5.
Logiball, Inc. advertisement in *Cleaner*, Dec. 2007, p. 62.
American Logiball advertisement in Cleaner, Jun. 2004, p. 81.
Logiball, Inc. brochure, allegedly printed Nov. 2004, allegedly handed out at trade shows beginning Feb. 2005.
Logiball, Inc. brochure, apparently printed Feb. 2006, allegedly handed out at trade shows beginning 2006.

* cited by examiner

PACKER FOR INSTALLING SEALANT IN DEFECTIVE CONDUITS

BACKGROUND OF THE INVENTION

The present invention relates to the installation of sealant materials in conduits to repair leaks, and is particularly related to a packer and its use in installing grout for repairing leaks in underground pipes.

It has been well known for years that underground pipes can be repaired in place by installation of thin flexible liners impregnated with materials that cure to harden the liners and cause them to adhere to the interior surfaces of a pipe needing repair. While these systems work well in pipes that are straight and have good access via manholes the uniqueness of smaller interconnecting pipes with limited access increases the costs and diminishes the economic value.

For repair of localized defects in pipes, such as a defect along a particular part of the length of a pipe, it is known to install various types of grouting materials into the surrounding strata to seal and support by blocking the interior of the conduit or pipe at locations near opposite ends of a defective portion of the pipe, and then forcing grout material under pressure to the exterior of the pipe.

Various known packers isolate a short length of a conduit such as a sewer pipe and fill the majority of the interior space within the section of the pipe to be repaired, leaving a thin annular space between the packer and the interior surface of the defective portion of the pipe, so that a sealant such as grout can be installed in the annular space and can then be supported in place while the sealant cures to a desired degree before the packer is removed. While some such packers have proved to be effective in large pipes, where the interior of the pipe is easily accessible through manholes or other access ports, practical packers that can negotiate tight bends for use in smaller conduits have not been available, and repair of smaller underground conduits by sealing defects without excavation has been more difficult to accomplish.

Particularly in smaller sewers, to which access is available substantially only through cleanout pipes whose interior diameter is less than the interior diameter of the sewer pipes themselves, installation of grout has been difficult to accomplish, and effective repair has required excavation in more cases than is desired.

Additionally, in repair of smaller-diameter conduits, the risks involved in attempting to repair such pipes by using a relatively inexpensive fast-setting more dense cementitious grout, rather than a softer compressible chemical grouting material, as currently used in the market has been avoided, since hardening of a cementitious grout within a packer at a significant distance from the point of access to the pipe being repaired could require very expensive excavation in order to remove the packer. Packers on the market deliver the grout through tubing inside of the packer. If the tubing were to leak cementitious grout inside the packer, the potential exists to lock the device in place at a location with only very limited and expensive access.

On the other hand, use of chemical grout materials to fill voids in the soil surrounding leaking underground conduits is also undesirably costly and has an arguable performance.

What is desired, then, is a packer that can be inserted into underground and other conduits that are accessible only with difficulty, so that repairs of such conduits can be effected in situ by installation of sealant materials such as various types of grouting material, including cementitious grouting material, without undue risk of sealant material solidifying inside the packer device and becoming captured inside the conduit and requiring excavation or otherwise difficult and expensive operations to retrieve the packer and effect repair of the conduit.

SUMMARY OF THE DISCLOSURE

Apparatus and method for its use as disclosed herein provide answers to some of the difficulties with respect to the prior art mentioned above, in order to provide for economical and effective in situ repair of conduits such as underground sewer pipes by installing sealant materials such as various types of grout.

In apparatus embodying one aspect of the present disclosure, an inflatable flexible packer is provided which can be deflated and contracted into a compact, slender form permitting installation of the packer through a conduit of a smaller size than the conduit in which the packer is to be used to effect repairs.

A packer that is one embodiment of the disclosed apparatus may be installed by the use of pushrods and/or ropes to move the packer to a desired location along the length of a defective conduit.

In one embodiment of the apparatus disclosed herein, a hollow flexible elongate body of the packer is constructed so that when it is inflated at a desired location along a conduit to be repaired, opposite sealing portions of the body, located near ends of the packer, expand to engage the interior surfaces of the conduit tightly, while a centrally located sealant placement portion of the body helps to define a space through which sealant material can flow to locations where it is needed to fill cracks and to fill voids surrounding the defective conduit as needed.

Also disclosed herein is a method of repairing defective conduits in situ by providing a quickly-setting sealant as separate fluid components, mixing the components in the portion of the conduit where repair is needed. Another aspect of the method includes directing the mixed sealant material to locations where it can fill and seal defects in the conduit, without having to fill a defective length of the conduit completely.

The foregoing and other features of the apparatus and method of the invention will be more readily understood upon consideration of the following detailed description of the invention taken in conjunction with the accompanying drawings.

DETAILED DESCRIPTION OF PREFERRED EMBODIMENTS

Figure 1:
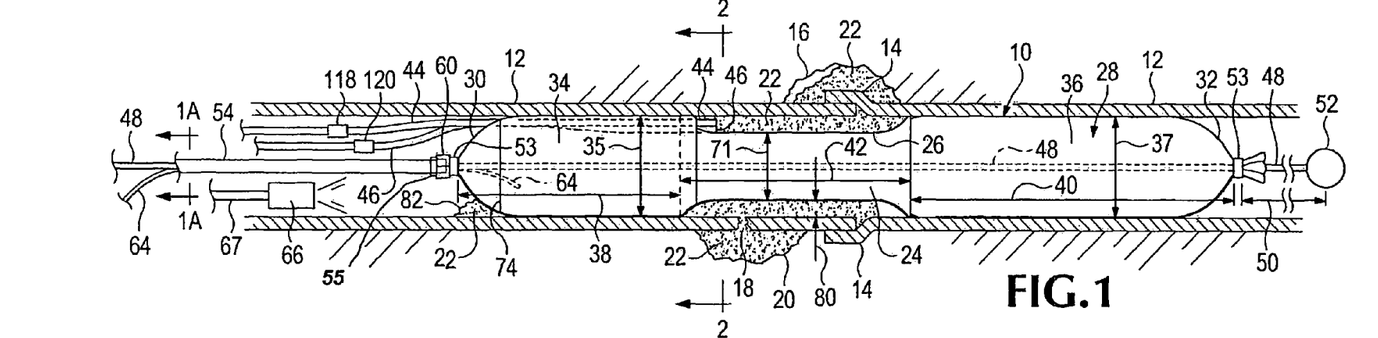
FIG. 1 is a side elevational view of a packer embodying the present invention in place in a conduit shown in section view, together with a pushrod and a pair of sealant hoses connected with the packer, and showing sealant material in place within the pipe and supported by the packer.

Referring now to the drawings, which form a part of the disclosure herein, in FIG. 1 a packer 10 is shown in place in a conduit 12 shown in section view. The conduit 12 may be a sewer pipe of conventional concrete, ceramic, or plastic construction and includes a joint 14 where an end of one section of the conduit 12 fits within an enlarged end portion of the adjacent section of the conduit.

A cavity 16 is shown above the joint 14, where leakage of the joint 14 has, with passage of time, permitted groundwater enter the conduit, carrying suspended or dissolved soil until the cavity 16 resulted. Such cavities can, over time, become enlarged and thus weaken support for soil above an underground conduit. Groundwater entering into a conduit 12 through such leaks can collectively greatly increase the volume which must be carried through a sewer pipe system. It is therefore important to locate and stop such leakages.

A defect such as a crack or other hole 18 is shown in the bottom of the conduit 12 and has also resulted in a cavity 20 beneath the conduit 12 as a result of water surrounding the conduit carrying suspended and dissolved soil into the conduit over some period of time.

As will be explained in greater detail presently, the packer 10 is deployed within the illustrated section of the conduit 12 and is being used for installation of a sealant such as a quantity of grout 22 into the cavities 16 and 20 through the leaking, defective, portion of the joint 14 and through the hole 18, in order to seal and fill the leakages in the joint 14 and to fill and seal the hole 18, as well as filling at least a portion of each of the cavities 16 and 20. Pressure less than inside the packer 10, yet greater than external ground water, exerted on the fluid grout 22 forces the grout outward from the interior of the conduit 12 through the leaks at the joint 14 and the hole 18, and through other cracks and holes and similar defects which may be present in a portion of the conduit 12 where the packer 10 is being utilized. A quantity of the sealant material remains on the exterior of the conduit 12, where it can replace a portion of the soil which has been washed away through the leakages and thus restore some of the function of the soil as a supporting mechanism for the conduit 12. Some of the grout 22 or other sealant surrounds a sealant placement portion 24 of the packer 10, in the form of a tubular or sleeve-shaped quantity of grout 22, introduced as a fluid into the space 26 surrounding the sealant placement portion 24.

Referring now also to FIGS. 2, 3, 3A, 3B and 4, the packer 10 has an elongate, flexible, fluid-tight, inflatable, elastic body 28 including a first end 30 and an opposite second end 32. A first sealing portion 34 having a diameter 35 extends from the first end 30 toward the second end 32, and a second sealing portion 36 having a diameter 37 extends from the second end 32 toward the first end 30. The sealant placement portion 24 is located between the first and second sealing portions 34 and 36, extending from one to the other. The first sealing portion 34 has a length 38, from the sealant placement portion 24 toward the first end 30, and the second sealing portion 36 has a length 40 from the sealant placement portion 24 toward the second end 32, that is greater than the length 38. The sealant placement portion 24 has a length 42 intended to be great enough to extend far enough on each side of a joint 14 for placement of the packer 10 within a conduit 12 to be accomplished routinely with sufficient accuracy to insure that sealant material 22 is placed within the conduit 12 in the most appropriate location with respect to a particular joint 14.

At least one grout conduit 44, and as shown in FIG. 1 a pair of grout conduits 44 and 46 extend from a location adjacent to the first end 30 to the sealant placement portion 24.

A stiff but flexible pushrod 48 extends longitudinally through the center of the body 28 of the packer 10, from the first end 30 to the second end 32. A leading end portion of the pushrod 48 may extend beyond the second end 32 of the body 28 by a distance 50 of, for example, 18 inches, to a guide ball 52 which may be of a durable, slippery plastic material carried on a forward end of the pushrod 48. The ball 52 may be spherical or teardrop shaped. At the second end 32 of the body, the elastic material of the body 28 is gathered and held tightly around the pushrod 48, as by a clamp 53, and may be sealed, if necessary, with an appropriate sealant material to keep the interior of the body 28 fluid-tight to contain pressurized air to expand the packer 10 and keep it in place in a conduit 12 during installation of a sealant material.

Figures 3, 3A, 4:
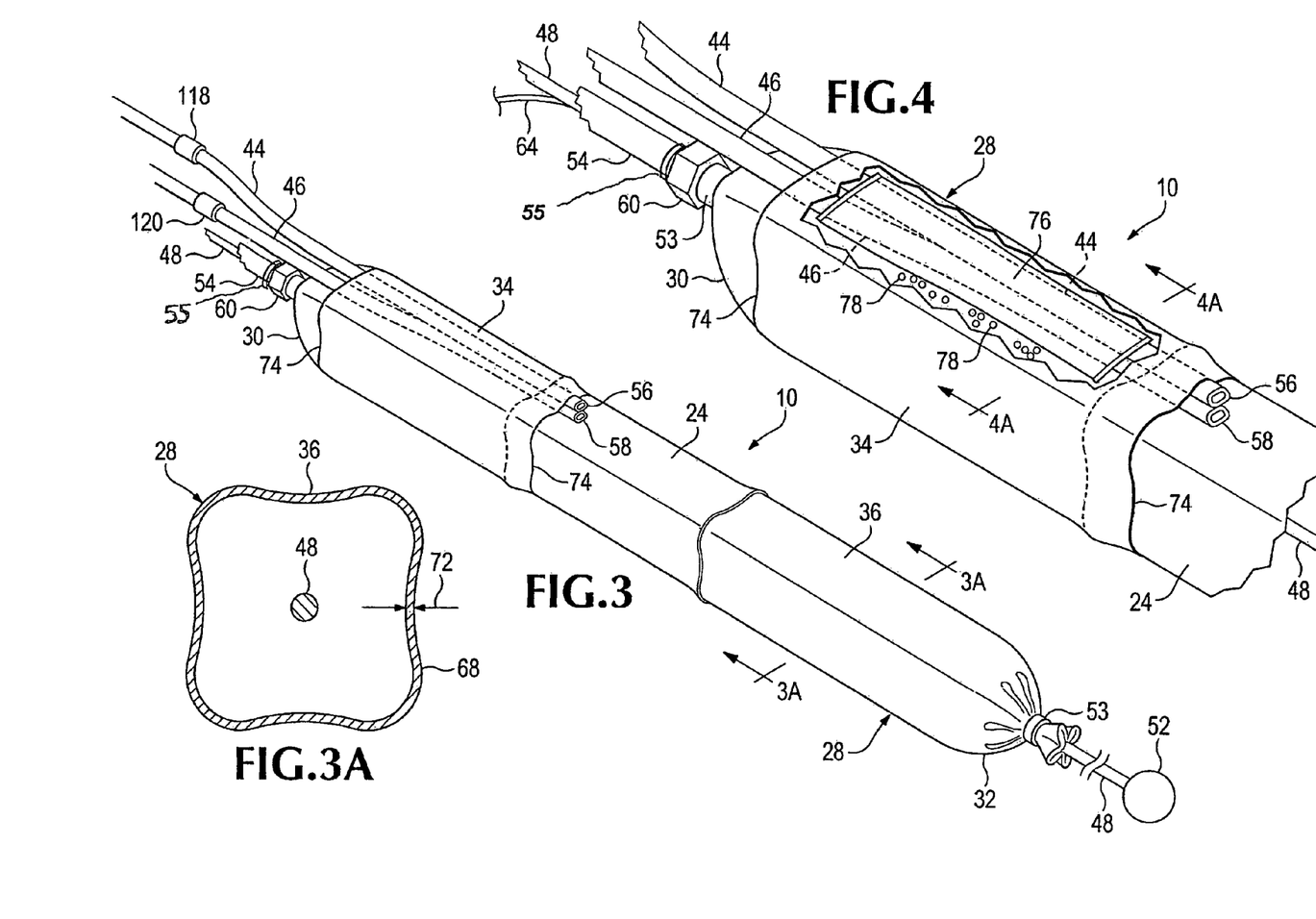
FIG. 3 is an isometric view of the packer shown in FIGS. 1 and 2, showing the packer in a partially inflated state.
FIG. 3A is a sectional view taken along line 3A-3A of FIG. 3.
FIG. 4 is a partially cutaway isometric view of a detail of the packer shown in FIG. 1, showing the arrangement of sealant hoses and discharge openings from the sealant hoses.

As may be seen clearly in FIGS. 3 and 4, the grout conduit 44 defines a grout discharge port 56, and the grout conduit 46 defines a grout discharge port 58. The grout discharge ports 56 and 58 are located adjacent to the exterior surface of the sealant placement portion 24, so that a fluid sealant material delivered through the grout conduits 44 and 46 can be discharged into the space 26 from the grout discharge ports 56 and 58 when the packer 10 is installed within a defective section of the conduit 12, in order to effect repairs to leaks such as those in the joint 14 and the hole 18.

Figure 1A:
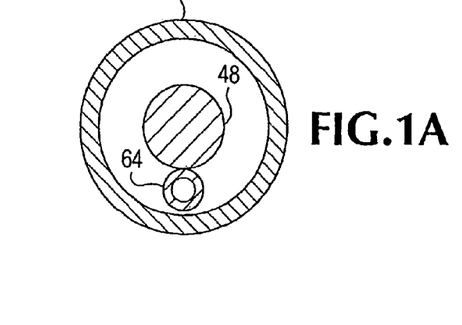
FIG. 1A is a detail view of a portion of a flexible support rod within the body of the packer shown in FIG. 1.

As shown in an enlarged detail view in FIG. 1A, the pushrod 48 may be of conventional construction of resin or fiber reinforced resin and extends through a flexible conduit or tube such as a hose 54 equipped with a hose coupler fitting 55 that connects to opposite hose coupler fitting 60 incorporated in the packer 10 at its first end 30, where another clamp 53 may be used, as well. The hose 54 can be used to conduct air under pressure into the interior of the body 28 of the packer 10. Such compressed air can pass through the hose 54 along and around the pushrod 48 extending within the hose 54, to inflate the body 28 of the packer 10. A pressure gauge tube 64 may be a conventional small plastic tube with an open end inside the inflatable body 28, extending alongside the pushrod 48 within the hose 54 to a gauge at the opposite end of the hose 54 to indicate the pressure within the inflated body 28 of the packer 10 during its use. Suitable fittings (not shown) allow compressed air to be provided into the hose 54.

A small television camera 66 mounted on a separate pushrod 67 may be utilized within the conduit 12 in a location where the first end 30 and the first sealing portion 34 of the packer 10 may be seen, in order to monitor the deployment and operation of the packer 10 during the installation of a sealant to repair a defective portion of the conduit 12.

As may be seen in FIGS. 3 and 3A, with an internal air pressure only barely greater than the ambient air pressure, the body 28 is inflated to the shape of the packer 10 substantially as manufactured. As shown in FIG. 3A, the as-manufactured cross-sectional shape of the packer, except at its ends 30 and 32, may resemble a square with rounded corners and slightly indented sides, and with little or no difference between the size of the first sealing portion 34, the second sealing portion 36, and the sealant placement portion 24.

Compressed air may be provided through the hose 54 and the fitting 60 to the interior of the body 28 to inflate the packer 10 in the conduit 12. The elastic structure of the packer 10 results in the wall 68 of the body 28 stretching in a controlled manner so that the first and second sealing portions 34 and 36 expand elastically at somewhat different rates, to occupy the full interior of the conduit 12 and to press against the interior surfaces of the walls of the conduit 12 as shown in FIG. 1 to effect a fluid-tight seal within the conduit 12. The sealant placement portion 24 is also constructed to be elastic, but with a greater modulus of elasticity, to expand at a slower rate with a similar increase in pressure within the body 28, so that, as shown in FIG. 1, the sealant placement portion 24 may define a tubular, annular, space 26 between the interior surfaces of the conduit 12 and the exterior surfaces of the sealant placement portion 24 at the same time that the first and second sealing portions 34 and 36 are in fluid-tight sealing contact with the interior surfaces of the conduit 12.

Figure 2:
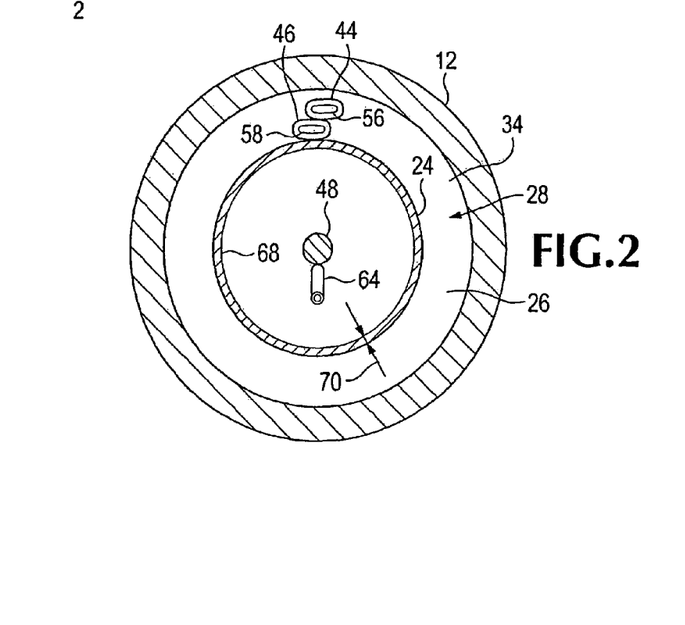
FIG. 2 is a section view taken along line 2-2 of FIG. 1.
Figures 4A, 5, 6A, 6B:
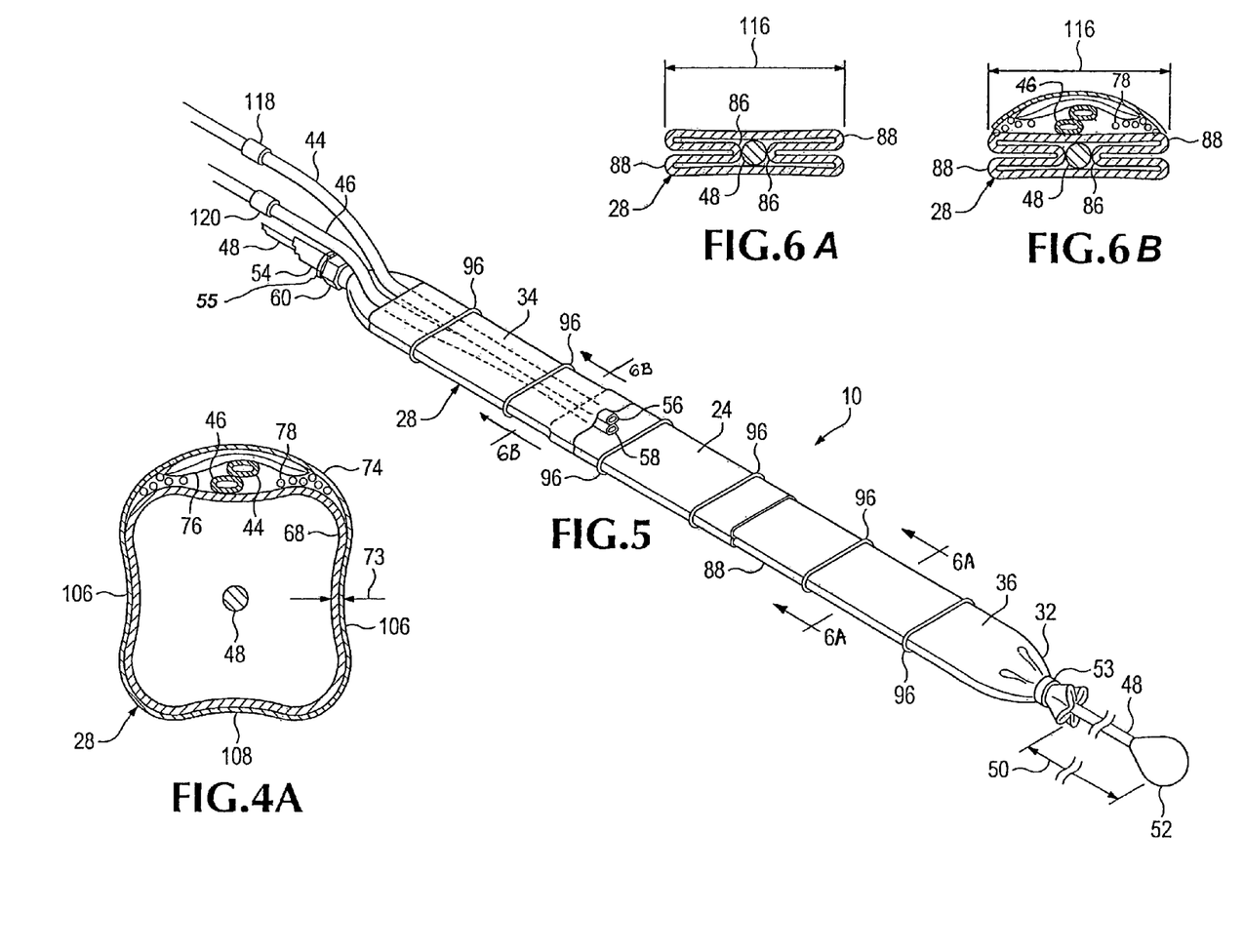
FIG. 4A is a sectional view taken along line 4A-4A of FIG. 4.
FIG. 5 is an isometric view of the packer shown in FIGS. 1-4A, with the packer collapsed and folded into a compact slender configuration, ready for insertion into and movement along the interior of a defective conduit to a location where repair is required.
FIGS. 6A and 6B are sectional views taken along lines 6A-6A and 6B-6B of FIG. 5, showing the shape of the packer body in its folded, compact configuration.

This difference in rates of elastic expansion of the different parts of the body 28 may be accomplished in more than one way, and, as shown herein, it is accomplished by the wall thickness 70, shown in FIG. 2, of the sealant placement portion 24 being greater than either the wall thickness 72, shown in FIG. 3A, of the second sealing portion 36, or the wall thickness 73, shown in FIG. 4A, of the first sealing portion 34. Thus with the body 28 inflated as shown in FIG. 1 to a pressure provided by compressed air delivered to the interior of the body 28 through the hose 54, and with the first sealing portion 34 and second sealing portion 36 expanded to fill the interior space within the conduit 12, the sealant placement portion 24 may be inflated only to a smaller diameter 71, leaving the space 26 as shown in FIG. 1. The actual pressure inside the pressurized interior of the body 28 may be sensed by a gauge (not shown) connected to the gauge tube 64, so that the correct pressure is provided. Since the sealant placement portion 24 is elastic, with air pressure within the body 28 increased beyond that producing the configuration shown in FIG. 1 the sealant placement portion 24 can also be expanded to fit tightly against the interior surfaces of the wall of the conduit 12. In that case there would be a smaller pressure exerted by an exterior surface of the sealant placement portion 24 against the interior surface of the wall of the conduit 12 than is exerted by either of the sealing portions 34 and 36, since a greater portion of the pressure within the body 28 is opposed by the greater elastic restorative force of the thicker wall of the sealant placement portion 24 of the body 28.

Figures 7, 7A, 7B:
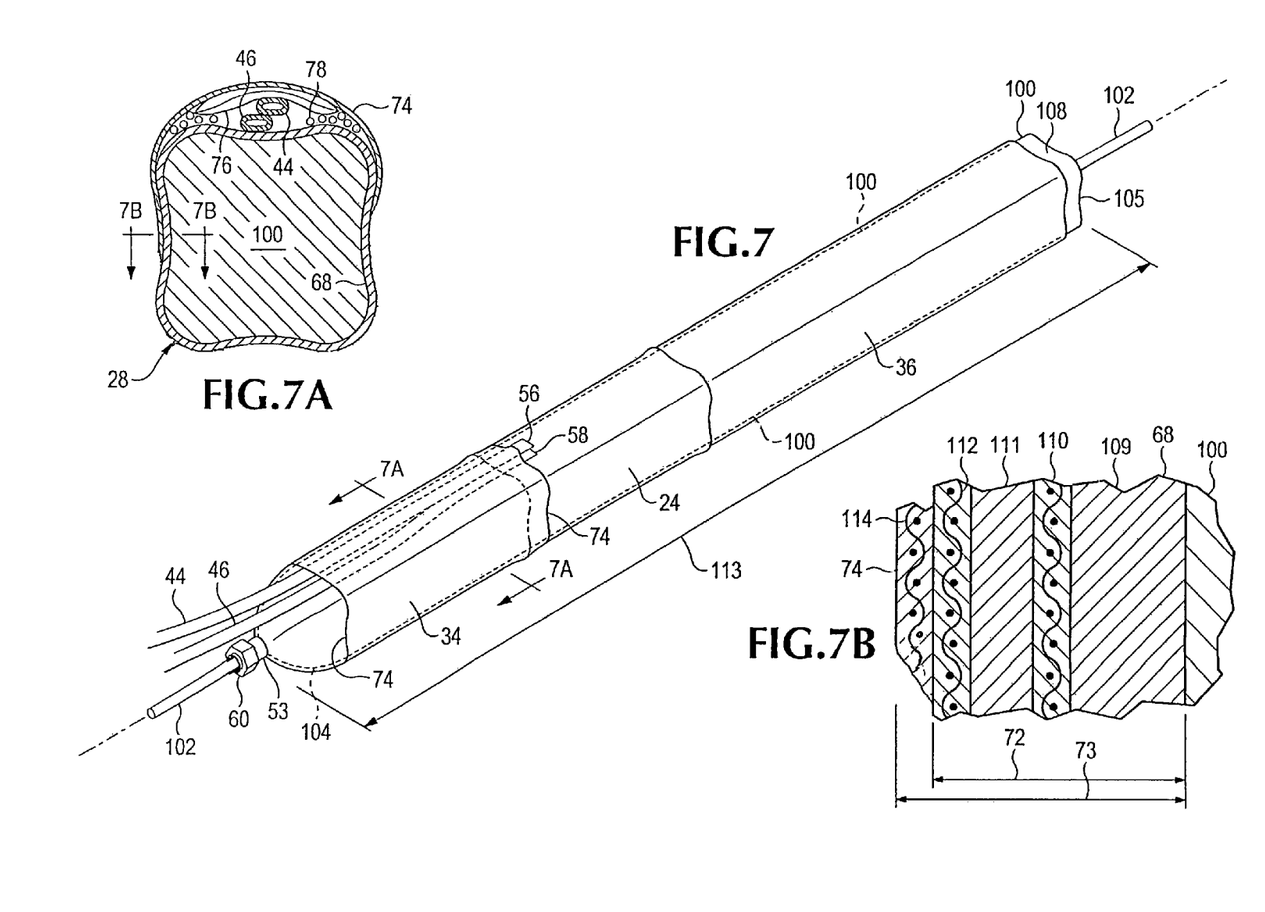
FIG. 7 is a foreshortened isometric view of a mandrel and a partially-made body for a packer of the type shown in FIGS. 1-6B.
FIG. 7A is a sectional view of the mandrel and packer shown in FIG. 7, taken along line 7A-7A of FIG. 7.
FIG. 7B is a sectional view taken along line 7B-7B of FIG. 7A.

Referring again to FIGS. 4 and 4A, it may be seen that the grout conduits 44 and 46 extend longitudinally along the first sealing portion 34, adjacent the exterior of the elastic pressure-containing wall 68 of the body 28. A cover, in the form of an additional layer 74 of elastic material that may be similar to that of which the wall 68 is made, may extend as a tube around the first sealing portion 34 and around a short portion of the sealant placement portion 24, covering the grout conduits 44 and 46 and keeping them closely alongside the first sealing portion 34. Alternatively, the cover layer 74 may extend over less than the entire circumference of the first sealing portion 34, as shown in FIG. 7A. In order to ensure that the outer surface of the additional elastic cover layer 74 remains unwrinkled and smooth enough to effect a satisfactory fluid-tight seal of the first sealing portion 34 against the interior of a conduit, soft, somewhat compressible spacing and cushioning material is placed alongside the grout conduits 44 and 46 between the elastic cover layer 74 and the exterior of the wall 68. As shown in FIG. 4, an inflated bag or tube 76 of polyethylene or other strong, somewhat elastic plastic film may be used as cushioning. Such inflated tubes are well known for cushioning irregularly shaped and fragile articles in packaging for shipment. For example a rectangular tube 76 about 3 inches wide and 12 inches long with its ends sealed may be filled loosely so that it has an inflated height of about $3⁄16$ inch, for example, and can fit between the grout conduits 44 and 46 and the cover layer 74. The tube 76 can fill the available space, changing shape to fit the space as the grout conduits are filled or collapsed. Additionally, or alternatively, small pieces 78 of synthetic sponge rubber or similar material might be used to serve the same purpose, so that outward pressure of the elastic wall 68 when the body 28 is inflated can effectively urge the additional elastic layer 74 outwardly against the adjacent interior surfaces of a conduit.

With the packer 10 in place and inflated sufficiently to cause the first and second sealing portions 34 and 36 to form a fluid-tight seal against the interior of a conduit 12, sealant material may be introduced into the space 26 surrounding the sealant placement portion 24 by forcing a material such as fluid grout 22 or separate fluid components of a sealant material under sufficient pressure through the grout conduits 44 and 46 to the grout discharge ports 56 and 58 on the exterior of the sealant placement portion 24, between the first sealing portion 34 and the second sealing portion 36. The fluid sealant material is thus forced around the entire periphery of the sealant placement portion 24 to seek an escape path from the space 26 through a defect in the wall of the conduit 12, such as the leaks in the joint 14 or the hole 18. As the sealant migrates outward through defects in the conduit, additional sealant material can be provided under pressure into the space 26 until the cavities 16 and 20 are filled completely, at which time back pressure would increase where sealant material is being introduced into the grout conduits 44 or 46, distant from the packer 10. Alternatively, once sealant material has been delivered through the grout conduits 44, 46 in an amount determined to be sufficient to adhere to exterior surfaces of the conduit 12, covering defects well enough to provide a satisfactory seal and mechanical support for the conduit 12, delivery of sealant might be discontinued.

Preferably, the body 28 will be inflated to a pressure sufficient not only to expand the sealing portions 34 and 36 into contact with the interior surfaces of the conduit 12, but to expand the sealant placement portion 24 to approach or fit closely against the interior surfaces of the conduit 12. With the ideal pressure within the body 28 the sealant placement portion 24 will exert a small enough outwardly directed pressure so that sealant can easily be introduced through the grout conduits 44 and 46, forming and simultaneously filling a space 26. The inflation pressure within the body 28 can then continue to act upon the fluid sealant material within the space 26, urging it outward through defects in the portion of the conduit 12 between the first and second sealing portions 34 and 36 until only a relatively small radial distance 80 remains between the sealant placement portion 24 and interior surfaces of the conduit 12.

When no more sealant material is being forced outward through defects in the conduit 12, if additional sealant material 22 is forced through the grout conduits 44 and 46 into the space 26, sealant material may be forced outward from the space 26 and alongside the first sealing portion 34 to a location as shown at 82 in FIG. 1, where the excess grout 22 may be observed by the television camera 66 within the conduit 12. Two aspects of the structure of the packer 10 are intended to result in such excess sealant material, if any, being able to escape to the location 82, where it could be observed, rather than escaping at the second end 32. First, the second sealing portion 36 has a smaller wall thickness 72, as a result of not having the additional elastic layer 74 that surrounds the grout conduits 44 and 46 along the first sealing portion 34, so the second sealing portion 36 will have greater pressure against the interior of the conduit 12. Additionally, the previously-mentioned greater length of the second sealing portion 36 also contributes to a greater total sealing force between the second sealing portion 36 and the interior surfaces of the conduit 12.

To facilitate insertion of the packer 10 into a location within a conduit 12 where repair is needed, the packer 10 may be folded easily to a slender, compacted, flattened configuration as shown in FIGS. 5 and 6, as a result of the original shape in which the body 28 is constructed, shown in section in FIGS. 3A and 4A. Because of that original shape, when the body 28 of the packer 10 is deflated and evacuated the packer 10 tends to assume a shape with predetermined folds extending longitudinally, and can be shaped into an elongate flat, or ribbon-like compact configuration as shown in FIGS. 5 and 6 by folding side portions 86 inward, while the corners of the rounded square cross sectional shape shown in FIG. 3A are folded more tightly to extend outwardly as shown at 88, and top and bottom surfaces 90 and 92 extend nearly flat in a generally planar shape. Elongate outwardly directed or convex folds at 88 and an inward or concave fold 86 thus extend longitudinally along the length of the packer 10 on each of the opposite sides. To maintain the compact, flat, ribbon-like configuration shown in FIGS. 5 and 8, bindings 96 may be placed around the packer 10 at spaced-apart locations along its length. The bindings 96 may be common rubber bands, or other items may be used, so long as they are sufficiently strong to help keep the packer 10 in the desired generally ribbon-like slender configuration, yet are more elastic than the packer or weak enough to be burst easily when the packer 10 is inflated in its ultimately desired position within a conduit 12.

The packer 10 may be made by building up a layer of rubber, as by applying liquid latex to a suitable mandrel 100, as shown in FIG. 7. For example, a suitable prevulcanized liquid natural latex rubber that air-cures at room temperature is readily available for use in mold-making from Environmental Technology of Fields Landing, Calif., under the trademark Mold Builder. The mandrel 100 may be of shaped wood coated with epoxy or any suitable surface with a smooth finish from which rubber can easily be released. A rod 102 extends longitudinally from each end to establish an axis of rotation extending centrally and longitudinally through the mandrel 100 so that it may easily be rotated during the manufacturing process. A first end 104 of the mandrel may be tapered and rounded to a bullet-nose shape which will accommodate attachment of the grout conduits 44 and 46. The hose connector fitting 60, such as a female garden hose fitting, is slid over the rod 102 at the first end, to be included in the body 28. The basic sectional shape of the remainder of the length of the mandrel 100 is similar to that of the interior of the body 28 as shown in FIG. 3 A, with at least one pair of opposite sides having concave channels 106 to promote the inward folds 86. Similarly, both the top and opposite bottom of the mandrel may also define shallow channels 108, as shown in FIGS. 7 and 7A.

The body 28 of the packer 10 may be formed by first applying multiple layers of latex to the mandrel 100, to build up an airtight elastic membrane. For example, liquid latex may be brushed on to the exterior of the mandrel 100 on all sides, from the hose fitting 60 and the rounded first end 104 to a location near the opposite end 105 of the mandrel. Each coat of liquid latex is allowed to cure at least partially, in a warm place, after which another coat is laid on, until a uniform layer 109, of cured latex, shown in FIG. 7B is formed with a thickness of, for example, about ⅛ inch, covering the entire mandrel 100 from the rounded first end 104 toward the opposite end 105. A subsequent layer of latex is then applied, and while it remains tacky, a reinforcing fabric, such as a layer 110 of a stockinet knitted fabric in the form of a tube of an appropriate size, may be applied around the mandrel 100 and the layer of latex and smoothed out along the exterior surface of the latex. The stockinet material may be of polypropylene or other appropriately strong and somewhat elastic fiber. Such stockinet material is widely available in the form of tubes of various diameters and in any desired length. Latex is applied in additional coats sufficient to embed the stockinet material and cause it to adhere to the outside of the previously formed layer of latex. The latex is then allowed to cure. Additional coats of latex may be applied as at 111 to increase the thickness of the reinforced layer of latex, and an additional layer 112 of stockinet polyethylene material may also be added and embedded in latex as described with respect to the first stockinet layer.

The sectional shape of the mandrel may be uniform along its entire length, apart from the rounded first end 104. The mandrel is long enough to permit production of a packer 10 of a desired length, which may, for example, include a first sealing portion 34 having a length 38 of 12-16 inches and a second sealing portion 36 having a greater length 40 of about 18-24 inches, preferably at least 150 percent as long as the first sealing portion 34. The sealant placement portion 24 may have a length 42 in the range of at least about 8 inches, enough to span a joint 14 in a conduit 12 of common material, to at least about 32 inches, depending at least in part on the type and chemical composition of the sealant material 22 intended to be installed using the packer 10. The required length 113 of the mandrel 100 is thus determined by the desired length of the finished packer 10, as the layered latex and stockinet material for the wall 68 of the body 28 must extend along the mandrel 100 further than the length of the finished body 28 of the packer 10 in order to provide additional material to be clamped tightly and sealed around the pushrod 48 at the second end 32 of the packer 10.

Along a portion of the mandrel 100 corresponding to the location of the sealant placement portion 24 of the finished packer 10, additional coats of liquid latex may be applied in a similar manner to increase the wall thickness of the sealant placement portion 24 to the wall thickness 70, shown in FIG. 2. In adding to the thickness of the wall 68 of the body 28 in the sealant placement portion 24, an additional layer of stockinet fabric (not shown) may also be provided. The greater wall thickness 70 in the sealant placement portion 24 is desired to cause the sealant placement portion 24 of the body 28 to expand at a slower rate than do the first and second sealing portions 34 and 36 in response to increasing air pressure within the body 28. Thus it is not critical whether there is merely a greater thickness of latex, or greater thickness of latex accompanied by one or more additional layers of stockinet fabric, in the sealant placement portion 24. Alternatively, the sealant placement portion 24 of the wall 68 of the body 28 might be formed of a different latex or other rubber material that is less elastic.

When the body 28 has been laid up on the mandrel 100 to include the first and second sealing portions 34 and 36 and the sealant placement portion 24, the grout conduits 44 and 46 may be laid upon the exterior of the first sealing portion 34, extending longitudinally from a point on the rounded first end portion and longitudinally along the top side 112 and extending an additional small distance onto the top side of the sealant placement portion 24, as may be seen in FIGS. 4 and 7. The grout discharge ports 56 and 58 are thereby exposed preferably at some distance from the end of the sealant placement portion 24, although they need not extend to the middle of the length 42 of the sealant placement portion 24.

At least the portions of the grout conduits 44 and 46 that lie along the latex layer of the packer 10 may be of latex material, separately fashioned in a manner similar to that of making the body wall 68, and optionally including an embedded tubular layer of stockinet fabric. The grout tubes 44 and 46 may advantageously be shaped to be able to lie in a generally flat ribbon-like configuration when not filled by a sealant material. The grout discharge ports 56 and 58 are defined by the end of each of the grout conduits, and may be shaped to open outwardly away from the exterior surface of the sealant placement potion 24 so as to direct the sealant material radially outward and toward the interior surface of a conduit in which the packer 10 may be used.

In order to cause separate fluid components of a sealant material to mix easily with each other upon discharge from the grout conduits 44 and 46, the grout discharge ports 56 and 58 may be close to each other, may overlap at least partially with respect to the width of each, as may be seen in FIGS. 3 and 7. The grout conduits 44 and 46 may be adhered to the exterior of the body 28 by coat of liquid latex, after which the tubes 76 or sponge pieces 78 mentioned previously may be placed over and alongside the grout conduits 44 and 46. Additional layers of latex and optionally a tube of stockinet fabric 114 may be applied to form the additional elastic sleeve or layer 74 surrounding the grout conduits 44 and 46 and the tubes 76 or sponge pieces 78. Such a layer 74 may also extend completely around the first sealing portion 34 and a portion of the sealant placement portion 24 to result in the construction shown partially cutaway in FIG. 4 and in section view in FIG. 4A.

When the elastic material of the body 28 has cured sufficiently the body 28 may be removed from the mandrel 100 by attaching a water hose to the fitting 60 and injecting water at the first end 30 to expand the body 28. The pushrod 48 may then be installed through the hose fitting 60 and the reinforced latex wall 68 of the body 28 at the second end 32 of the packer 10 may then be clamped tightly and sealed around the pushrod 48.

Packers 10 as described can thus be produced in appropriate sizes for convenient use in repair of a conduit 12 having an interior diameter of, for example, 4 inches to 12 inches, and a packer 10 designed for use in repairs of 6-inch pipe can in its compact configuration negotiate an 90° elbow in a 4-inch cast iron pipe during installation through a 4-inch cast iron cleanout pipe 115 into the 6-inch conduit 12 to be repaired. The transverse dimensions and circumference of the surface of the mandrel 100 are chosen to correspond with the interior circumference of a conduit to be repaired using the packer 10. Thus, the circumference of the surface of the mandrel, including the distance along the surface defining the channels 106 and 108, should be somewhat less than the internal circumference of a conduit 12 for which the packer 10 is intended, so that at least a small amount of elastic expansion is required when inflating the body 28 to make the first and second sealing portions 34 and 36 press against the interior surfaces of the conduit. The packer desirably has a natural circumference of less than ⅔ of that of the inside diameter of the pipe to be repaired and must stretch in order to contact the entire circumference of the pipe. This avoids the creation of surface folds and wrinkles that might interfere with a fluid-tight sealing contact between the exterior of each of the sealing portions 34 and 36 and the interior surfaces of a conduit 12. This relationship, then, between the transverse dimensions of the packer 10 and the interior size of a conduit 12 will naturally result in provision of a generally tubular space 26 surrounding the sealant placement portion 24, yet will allow increased internal pressure within the body 28 to expand the sealant placement portion 24 until it approaches or comes into contact with the interior of the conduit 12. A suitable mandrel might instead have a shape (not shown) including more acute convex corner angles and deeper channels, and more than four rib-like corners extending along its length, to provide for greater number of folds extending along its sides and a different, possibly more compact and slender configuration. This may permit a packer to be made to be able to be installed for use in a conduit 12 having an interior diameter as large as 10 inches through a conduit as small as a 4-inch cleanout pipe.

Figures 8, 9:
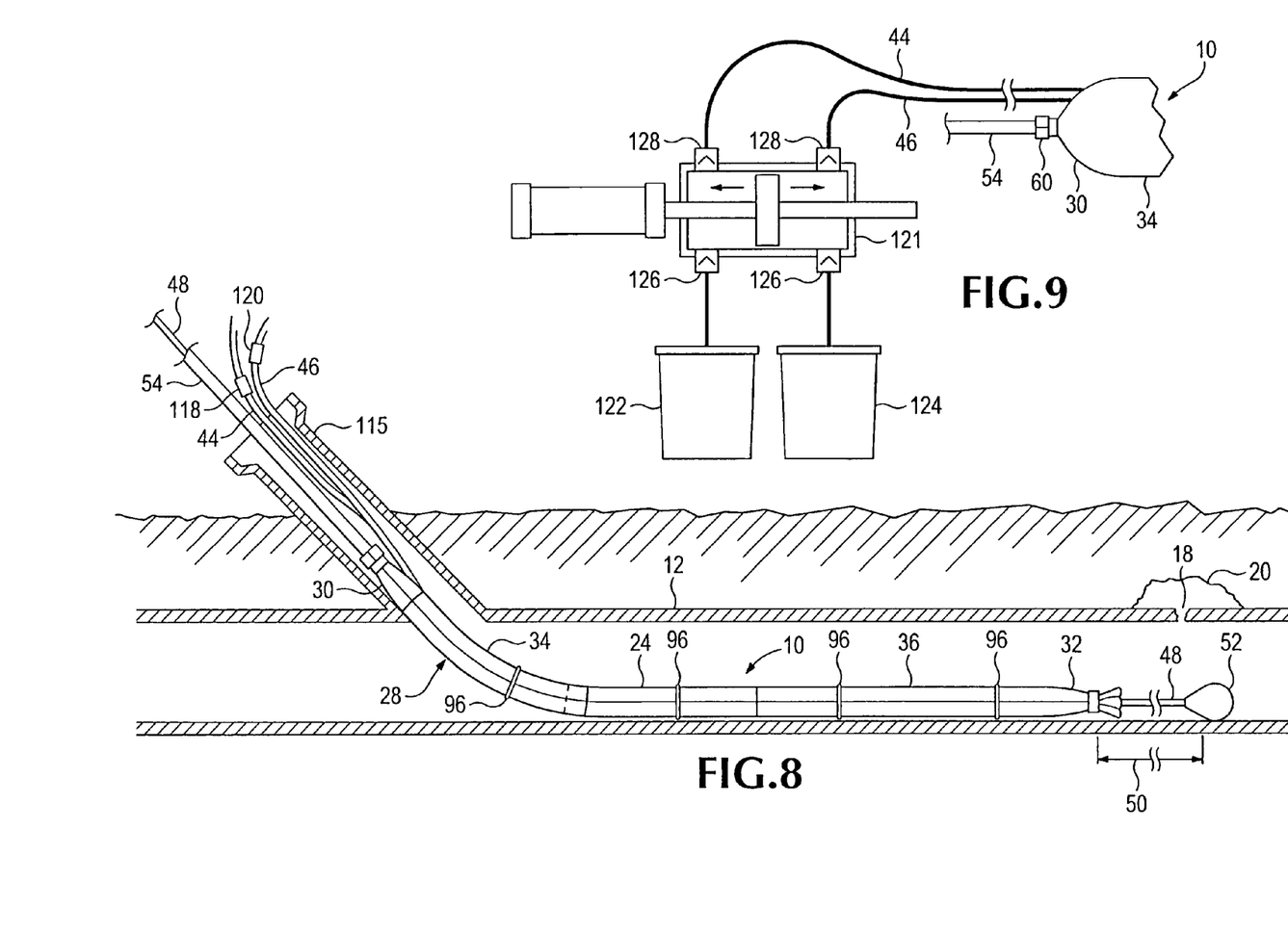
FIG. 8 is a simplified schematic view showing a packer such as that shown in FIGS. 1-6 being introduced through a cleanout pipe and moved through a sewer pipe toward a location where repair is needed.
FIG. 9 is a schematic view showing one arrangement of equipment for delivering sealant material to the packer shown in FIGS. 1-6.

With a hose 54 attached to the packer 10, a vacuum may be drawn, reducing fluid pressure within the inflatable body 28 below ambient atmospheric pressure, to collapse the body 28 into the compact slender configuration shown in FIGS. 5 and 6. The packer 10 may be installed into a conduit 12 in which defects must be repaired by pushing the packer into the conduit 12 through a conduit leading into the conduit 12. For example, as shown in FIG. 8, the packer 10 may be installed into a conduit 12 having an inside diameter of about 6 inches by passing the packer 10 into and through a cleanout pipe 115 whose inside diameter is 4 inches, with the ball 52 guiding the leading end portion of the pushrod 48 in negotiating the change of direction from the cleanout pipe 115 into the conduit 12, even where the change in direction is as much as a small radius 90° bend in the cleanout pipe 115. In its folded configuration shown in FIG. 6, the packer 10 of a size to be used in such a conduit 12 may have a width 116 of only about 3 inches, or ½ the diameter of the conduit in which the packer is to be used. The ball 52 is spaced apart from the second end 32 of the packer 10 by a distance 50 of, for example, about 12 to 24 inches, and is pushed by the pushrod 48, so that the packer 10 is led by the ball 52 as it negotiates bends and turns in the conduit 12 or the cleanout tube 114. The body 28 of the packer 10 then trails behind the connection of the second end 32 to the pushrod 48. The packer 10 can thus be installed with the use of a conventional pushrod 48 to repair defects and fill voids 20 defects at distances at least as great as 80 feet from the point of access to the open end of a cleanout tube 115. It will also be understood that in some situations the packer 10 might be pulled into a required location. For example, where only a very small clean-out pipe is available upstream from a defective sewer pipe, a rope can be floated downstream and attached to the packer 10 at such a downstream access point, and the packer can be pulled upstream to a desired location along the sewer or a lateral related to the clean-out pipe from a downstream access point, such as a manhole, by fastening the rope to the second end 32. The grout conduits 44 and 46 may be connected as shown at 118 and 120 to lengths of tubing of a flexible, somewhat stiff, and coilable type, such PEX tubing, which can be pushed into and along the conduit 12 and act as conduits from the pump 121 for the fluid sealant material components.

Using the packer 10, a desired sealant material may be installed. A premixed chemical grout might be installed through a single grout conduit 44 or 46. A sealant material which might cure more quickly and solidify in place within less than a minute after the two components of such a sealant mix with each other can also be installed, by providing the components separately through the grout conduits 44 and 46. For example, then, a cementitious grout that sets as quickly as 15 seconds after mixture of its components can be installed by providing a fluid cement slurry and a sodium silicate ($NaSO_2$) solution in equal quantities through the grout conduits 44 and 46 to be mixed near the grout discharge ports 56 and 58 within the space 26 and to be moved within a few seconds to a leaking joint 14 or a hole 18, to be extruded into a cavity 16 or 20 as shown in FIG. 1, where the grout 22 will quickly solidify and effect repair.

To provide the two components of such a mixture in the required proportions, a pumping arrangement may be connected with the conduits 44 and 46 as shown in FIG. 9. A positive displacement pump 121, shown in simplified diagrammatic form in FIG. 9 as a piston pump, may be a positive displacement pneumatically driven diaphragm-type pump. The pump 121 is arranged to produce equal displacement in each direction of movement of its diaphragm or piston. Each cycle of pump operation moves a small quantity, such as 2 or 3 ounces, of each of a pair of sealant components, which arrive alternatively at the grout discharge ports 56 and 58 in small amounts in alternating pulses. The small amounts of the two components quickly mix with each other and are pushed away from the grout discharge ports by additional quantities of sealant components, toward a defect in the wall of the surrounding conduit 12.

In the system shown, a first stroke of the pump 121 pushes a small quantity of one fluid sealant material component from bucket 122 along grout conduit 44 while at the same time an equal amount of the other fluid component is drawn into the opposite side of the pump from bucket 124. Check valves 126 and 128 associated with the inlet and outlet ports of the pump 121 prevent reverse flow of each sealant component, so that the following pump stroke in the opposite direction moves an equal small quantity of the sealant material component from bucket 124 along grout conduit 46 toward the grout discharge port 58 adjacent the sealant placement portion 24 of the packer 10.

Following delivery of a required quantity of a sealant material 22 to the space 26 the packer 10 is left in position, inflated, long enough for the sealant material to solidify or cure sufficiently to provide a secure repair of defects in the conduit 12 being repaired, after which the air pressure within the body 28 may be relieved, and a vacuum may be pulled, if desired, to reduce the packer to its compact slender folded configuration, facilitating removal of the packer. Because of the shape in which the latex of the elastic body 28 of the packer is laid up on the mandrel 100, the packer will assume a configuration significantly smaller than the interior of the conduit being repaired, permitting the packer 10 to be withdrawn easily by retracting the hose 54 and pushrod 48 and PEX tubes or other hoses attached to the grout conduits 44 and 46. Once the packer 10 has been removed from the conduit a root cutter may be used to skim excess sealant material 22 from the interior of the conduit to restore the conduit to its intended shape and size.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A packer for use in repair of conduits, comprising:
   (a) an elongate, collapsible, unitary and elastically inflatable, wholly flexible, hollow body having opposite first and second ends, respective first and second sealing portions adjacent said first and second ends, and a sealant placement portion located between said sealing portions;
   (b) each of said sealing portions of said body including a flexible fluid-tight wall that is elastically expansible radially in response to increasing internal pressure, to cause said sealing portions to engage an interior surface of a conduit sealingly when said body is inflated;
   (c) said sealant placement portion of said body being elastically expansible radially at a lesser rate than said sealing portions to approach said interior surface of a conduit in response to increasing internal pressure;
   (d) a sealant conduit being incorporated in said body proximate said first end thereof, said sealant conduit extending longitudinally along an outer side of said flexible fluid-tight wall of said first sealing portion; and
   (e) a sealant discharge port communicating with said sealant conduit and located adjacent said sealant placement portion of said body.

2. The packer of claim 1 wherein said sealant conduit extends longitudinally along a part of a length of said sealant placement portion and said sealant discharge port is located between said first and second sealing portions of said body.

3. The packer of claim 1 including a plurality of sealant conduits.

4. A packer for use in repair of conduits, comprising:
   a an elongate, elastically hollow body having opposite first and second ends, respective first and second sealing portions adjacent said first and second ends, and a sealant placement portion located between said sealing portions;
   (b) each of said sealing portions of said body including a flexible fluid-tight wall that is elastically expansible radially in response to increasing internal pressure, to cause said sealing portions to engage an interior surface of a conduit sealingly when said body is inflated;
   (c) said sealant placement portion of said body being elastically expansible radially at a lesser rate than said sealing portions to approach said interior surface of a conduit in response to increasing internal pressure;
   (d) a plurality of sealant conduits joined to said body roximate said first end thereof, said sealant conduits extending longitudinally along an outer side of said flexible fluid-tight wall of said first sealing portion and defining respective associated sealant discharge ports located closely adjacent each other; and
   (e) a respective sealant discharge port communicating with each of said sealant conduits and located adjacent said sealant placement portion of said body.

5. The packer of claim 4 wherein said sealant discharge ports overlap one another.

6. The packer of claim 1 wherein said sealant conduit is of elastomeric material and is collapsible to a configuration conforming to an exterior shape of said first sealing portion of said body.

7. A packer for use in repair of conduits, comprising:
(a) an elongate, elastically inflatable, flexible, hollow body having opposite first and second ends, respective first and second sealing portions adjacent said first and second ends, and a sealant placement portion located between said sealing portions;
(b) each of said sealing portions of said body including a flexible fluid-tight wall that is elastically expansible radially in response to increasing internal pressure, to cause said sealing portions to engage an interior surface of a conduit sealingly when said body is inflated;
(c) said sealant placement portion of said body being elastically expansible radially at a lesser rate than said sealing portions to approach said interior surface of a conduit in response to increasing internal pressure;
(d) a sealant conduit being joined to said body proximate said first end thereof, said sealant conduit extending longitudinally along an outer side of said flexible fluid-tight wall of said first sealing portion, and a portion of said sealant conduit being protected by an exterior cover of elastomeric material adhered to an exterior surface of said fluid-tight wall of said sealing portion of said body and a cushioning body being located adjacent said sealant conduit between said exterior cover and said exterior surface of said fluid-tight wall of said sealing portion; and
(e) a sealant discharge port communicating with said sealant conduit and located adjacent said sealant placement portion of said body.

8. The packer of claim 1 wherein each of said sealing portions and said sealant placement portion has a respective diameter and wherein said diameter of said sealant placement portion is less than said diameter of either of said sealing portions when said packer is free from restriction by a surrounding structure and is inflated to an internal pressure great enough to cause said body to expand elastically.

9. A packer for use in repair of conduits, comprising:
(a) an elongate, elastically inflatable, flexible, hollow body having opposite first and second ends, respective first and second sealing portions adjacent said first and second ends, and a sealant placement portion located between said sealing portions;
(b) each of said sealing portions of said body including a flexible fluid-tight wall that is elastically expansible radially in response to increasing internal pressure, to cause said sealing portions to engage an interior surface of a conduit sealingly when said body is inflated;
(c) said sealant placement portion of said body being elastically expansible radially at a lesser rate than said sealing portions to approach said interior surface of a conduit in response to increasing internal pressure;
(d) a sealant conduit being joined to said body proximate said first end thereof, said sealant conduit extending longitudinally along an outer side of said flexible fluid-tight wall of said first sealing portion; and
(e) a sealant discharge port communicating with said sealant conduit and located adjacent said sealant placement portion of said body, and wherein said body, in a compact, slender configuration, defines a plurality of longitudinally extending folds and has a width that is less than about ⅔ of a diameter of one of said sealing sections when said body is inflated.

10. The packer of claim 9 wherein said body includes at least a pair of opposite inwardly directed folds and at least two pairs of laterally outwardly projecting folds.

11. The packer of claim 9 wherein said body has at least four inwardly directed folds.

12. The packer of claim 9 wherein said packer in said compact, slender configuration is slender enough to fit through a conduit having a diameter no greater than ½ of a diameter of a conduit in which said packer is intended to be used.

13. A packer for use in repair of conduits, comprising:
(a) an elongate, elastically inflatable, flexible, hollow body having opposite first and second ends, respective first and second sealing portions adjacent said first and second ends, and a sealant placement portion located between said sealing portions;
(b) each of said sealing portions of said body including a flexible fluid-tight wall that is elastically expansible radially in response to increasing internal pressure, to cause said sealing portions to engage an interior surface of a conduit sealingly when said body is inflated;
(c) said sealant placement portion of said body being elastically expansible radially at a lesser rate than said sealing portions to approach said interior surface of a conduit in response to increasing internal pressure;
(d) a sealant conduit being joined to said body proximate said first end thereof, said sealant conduit extending longitudinally along an outer side of said flexible fluid-tight wall of said first sealing portion; and
(e) a sealant discharge port communicating with said sealant conduit and located adjacent said sealant placement portion of said body; and
(f) a stiff but resiliently flexible pushrod extending longitudinally within said body from said first end to said second end.

14. The packer of claim 13, wherein said pushrod has a leading end extending outward longitudinally from said second end of said body, and wherein said pushrod has a guide-ball carried on said leading end thereof.

15. The packer of claim 1 wherein said flexible fluid-tight wall of each of said sealing portions has a respective wall thickness and wherein said sealant placement portion includes a flexible fluid-tight wall and has a wall thickness that is greater than said respective wall thicknesses of said sealing portions, whereby said sealing portions are able to expand at a greater rate than said sealant placement portion in response to increasing fluid pressure within said body.

16. The packer of claim 15 wherein said flexible fluid-tight wall of said sealant placement portion includes a plurality of plies of supporting fabric.

17. The packer of claim 15 wherein said flexible fluid-tight wall of said sealant placement portion comprises a significant amount of an elastomeric material which has a higher modulus of elasticity than an elastomeric material that is a primary material of said sealing portions.

18. A packer for use in repair of conduits, comprising:
(a) an elongate, elastically inflatable, flexible, hollow body having opposite first and second ends, respective first and second sealing portions adjacent said first and second ends, and a sealant placement portion located between said sealing portions;
(b) each of said sealing portions of said body including a flexible fluid-tight wall that is elastically expansible radially in response to increasing internal pressure, to engage an interior surface of a conduit sealingly when said body is inflated;
(c) said sealant placement portion of said body being elastically expansible radially at a lesser rate than said sealing portions to approach said interior surface of a conduit in response to increasing internal pressure;
(d) a sealant conduit being joined to said body proximate said first end thereof, said sealant conduit being located entirely externally of an inflatable space within said elastically inflatable hollow body and being covered by a cover layer of elastic material attached to an exterior surface of said flexible wall of said first sealing portion of said body and extending longitudinally along an outer side of said flexible fluid-tight wall of said first sealing portion; and (e) a sealant discharge port communicating with said sealant conduit and located adjacent said sealant placement portion of said body.

19. The packer of claim 1 wherein said second sealing portion has a length that is greater than a length of said first sealing portion.

20. The packer of claim 19 wherein said length of said second sealing portion is at least 150 percent of said length of a said first sealing portion.

21. A method for repairing a conduit, comprising:

(a) inserting an elongate elastically inflatable packer in a slender configuration into a conduit that is to be repaired;

(b) utilizing a leading end portion of a flexible rod extending longitudinally through and beyond a leading end of the packer to guide the packer through the conduit;

(c) inflating a pair of sealing portions of the packer to close the conduit sealingly in locations spaced apart longitudinally along the conduit and spanning a defective section to be repaired;

(d) thereafter, conducting a quantity of a sealant material in fluid form into a space surrounding a sealant placement portion of the packer located between the ones of said pair of sealing portions, while maintaining closure of the conduit in the spaced apart locations spanning the defective section; and (e) urging a part of said quantity of said sealant material into a defect in said defective section.

22. The method of claim 21 including the step of restricting radial expansion of the sealant placement portion of the packer while inflating said sealing portions, thereby providing said space surrounding said sealant placement portion.

23. The method of claim 21 including the step of defining an annular space surrounding said sealant placement portion within a conduit being repaired and between said sealing portions of said body, when said body is inflated with said sealing portions in effective sealing contact against an interior surface of said conduit.

24. The method of claim 21 including delivering said quantity of said sealant material to said space surrounding said sealant placement portion of said packer in separately measured quantities of at least two components thereof.

25. The method of claim 24 wherein delivering said quantity of sealant material includes keeping said at least two components separate from each other until arrival in a location adjacent the sealant placement portion of said packer, and including the further step of mixing said at least two components with one another in said space surrounding said sealant placement portion.

26. The method of claim 25 including delivering said components of said sealant material by repeatedly delivering a respective small quantity of each of said components in a predetermined order to said location adjacent said sealant placement portion of said packer and within said conduit until a desired amount of sealant material has been delivered to the defective section of said conduit.

27. The method of claim 24 including the further step of delivering said components of said sealant material through respective separate flexible tubes, each of said flexible tubes extending longitudinally along a first one of said sealing portions of said packer to said sealant placement portion thereof.

28. The method of claim 24 wherein said sealant material comprises a first component consisting essentially of a cement slurry and a second component consisting essentially of sodium silicate solution.

29. The method of claim 21 including the further step of thereafter holding the sealant material in place long enough for the sealant material to cure into a form effective to repair the defect.

30. The method of claim 21 including the step of collapsing said packer into said slender configuration by deflating an inflatable body of said packer and folding said body along longitudinally extending folds incorporated in said body to give said body a reduced width.

31. The method of claim 30 wherein said step of collapsing said packer includes reducing fluid pressure within said inflatable body below ambient atmospheric pressure.

32. The method of claim 30 including the step of placing said packer in said location along said conduit by pushing said packer in said slender configuration into said conduit through an accessible conduit smaller than the conduit to be repaired and thence pushing said packer along said conduit that is to be repaired.

33. The method of claim 30 including the step of pushing said packer longitudinally through said conduit to said defective section thereof.

34. The method of claim 22 including the further steps of thereafter deflating the packer and withdrawing it from said defective section of said conduit, and subsequently cutting away a quantity of excessive sealing material from an interior of said defective section of said conduit.

35. The method of claim 22 including the step of using a television camera inside said conduit being repaired to observe said packer during installation of said sealant material and to detect leakage of said sealant material around said first sealing portion.

36. The method of claim 21 wherein said step of inserting an elongate elastically inflatable packer in a slender configuration into a conduit that is to be repaired includes utilizing a portion of said flexible rod to push said packer longitudinally into said conduit that is to be repaired.

* * * * *

UNITED STATES PATENT AND TRADEMARK OFFICE
CERTIFICATE OF CORRECTION

PATENT NO. : 8,186,385 B2
APPLICATION NO. : 12/459727
DATED : May 29, 2012
INVENTOR(S) : Jeffrey L. Iwasaki-Higbee Page 1 of 1

It is certified that error appears in the above-identified patent and that said Letters Patent is hereby corrected as shown below:

Column 12, line 39: Change "a an" to --(a) an--;

Column 12, line 39: Change "an elongate, elastically hollow" to --an elongate, elastically inflatable, flexible hollow--;

Column 12, line 53: Change "body roxi" to --body proxi--; and

Column 15, line 17: Change "a said first sealing" to --said first sealing--.

Signed and Sealed this
Ninth Day of October, 2012

David J. Kappos
*Director of the United States Patent and Trademark Office*